Sept. 10, 1957        W. BESEL        2,805,583

INFINITELY VARIABLE POWER TRANSMISSION

Filed June 23, 1954

INVENTOR:
WILHELM BESEL
BY:

United States Patent Office 2,805,583
Patented Sept. 10, 1957

2,805,583
INFINITELY VARIABLE POWER TRANSMISSION

Wilhelm Besel, Bad Homburg, Germany, assignor, by mesne assignments, to Reimers-Getriebe K. G., Rennweg, Zurich, Switzerland Application June 23, 1954, Serial No. 438,769

Claims priority, application Germany June 27, 1953

6 Claims. (Cl. 74—230.17)

The present invention relates to power transmissions.

More particularly, the present invention relates to infinitely variable power transmissions of the type where conical pulleys in engagement with endless belts are axially shiftable for the purpose of varying the transmission ratio between a driving and a driven shaft.

When such transmissions are used for transmitting great loads, several endless belts are provided between a series of conical discs or the like rotating with the driving and driven shafts. In such drives it is not possible to use metallic endless belts for transmitting the drive because the discs which engage the belts usually have conical surfaces of the same angle and upon being shifted cause the belts to become located at the portions thereof extending between the discs in planes inclined to the shafts carrying the discs, so that with the known constructions the belts must be capable of bending and therefore cannot be made of metal. As a result the load is not uniformly distributed among the several belts in such a transmission, as is also the case with a conventional multiple V-belt drive. Thus, with the known constructions, the transmission belts shift along the surface of the conical discs and the non-uniform loading of the several belts produce great wear and reduces the efficiency of the transmission.

It is an object of the present invention to overcome the above drawbacks by providing an infinitely variable power transmission in which the transmission belts will always be located automatically respectively in parallel planes which are normal to the driving and driven shafts.

Another object of the present invention is to provide a power transmission capable of utilizing metal belts so that very great loads can be efficiently carried with the transmission of the present invention.

A further object of the present invention is to provide a power transmission which will not produce torsional stresses on the transmission belts.

An additional object of the present invention is to provide a power transmission which will automatically distribute the load evenly among the several transmission belts.

With the above objects in view the present invention mainly consists of an infinitely variable power transmission which includes a driving shaft and a driven shaft spaced from and parallel to the driving shaft. A pair of outer discs are mounted on each shaft for rotation therewith, each pair of outer discs respectively having conical inner side faces directed toward each other. A pair of elongated, endless flexible belts are spaced from and extend about the shafts and are respectively located in parallel planes normal to the shafts, one of these flexible belts engaging the conical face of one of each pair of outer discs and the other of the flexible belts engaging the conical face of the other of each pair of outer discs. A pair of inner discs are respectively mounted on the shafts for turning movement therewith and for free axial movement therealong, this inner pair of discs being located between and in engagement with the pair of flexible belts to maintain the latter in engagement with the outer pairs of discs to transmit a drive from the driving to the driven shaft, the free movability of the inner pair of discs axially along the shafts, respectively, serving to automatically distribute the load evenly between the pair of flexible belts. The outer side faces of the inner pair of discs may be flat or conical to a very slight degree.

The novel features which are considered as characteristic for the invention are set forth in particular in the appended claims. The invention itself, however, both as to its construction and its method of operation, together with additional objects and advantage thereof, will be best understood from the following description of specific embodiments when read in connection with the accompanying drawings, in which:

Figure 1:
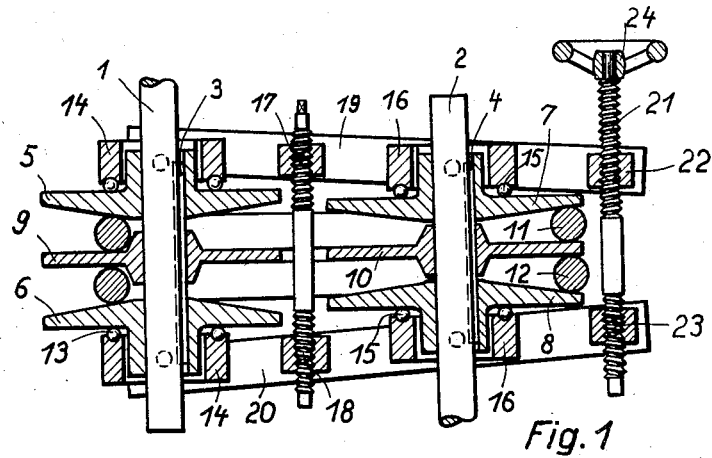
Fig. 1 is a schematic illustration, partly in section, of a drive constructed in accordance with the present invention.
Figure 2:
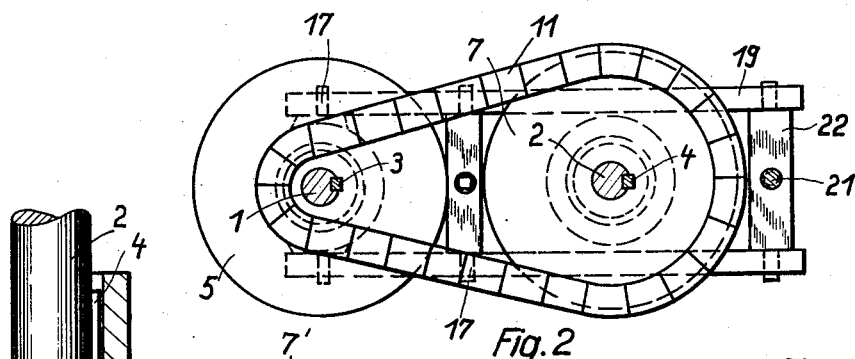
Fig. 2 is a sectional view of the structure of Fig. 1 taken in a plane normal to the shafts of Fig. 1 and located just below the uppermost discs of Fig. 1.

Referring now to the drawings, and to Figs. 1 and 2 in particular, it will be seen that the structure of the invention includes a driving shaft 1 and a driven shaft 2 which are suitably mounted for rotation about their axes in a housing of any known construction (not shown), these shafts being spaced from and parallel to each other. A pair of outer discs 5 and 6 are mounted on the shaft 1 for rotation therewith and for axial movement therealong through the medium of a key 3 extending along an axial groove in the outer surface of shaft 1 and extending into keyways of the discs 5 and 6. Similarly a pair of outer discs 7 and 8 are mounted on the driven shaft 2 for rotation therewith and for axial movement therealong through the medium of a key 4 which cooperates with the shaft 2 and discs 7 and 8 in the same way that the key 3 cooperates with the shaft 1 and discs 5 and 6.

A pair of inner discs 9 and 10 are mounted respectively on the shafts 1 and 2 also for rotation therewith and for free axial movement therealong, these inner discs 9 and 10 having outer side surfaces which are only slightly conical, which, as shown in Fig. 1, are conical to a degree far less than the other discs, and which appear to the naked eye to be almost flat. For example, an element extending radially along an outer side surface of either disc 9 and 10 may make an angle of approximately 1° with a plane normal to the shafts 1 and 2. On opposite sides of the discs 9 and 10 and in engagement therewith are a pair of endless flexible belts 11 and 12 which transmit the drive from the shaft 1 to the shaft 2. These belts may, if desired, be V-belts, but it is preferred to make these belts of metal, as described below.

Figure 3:
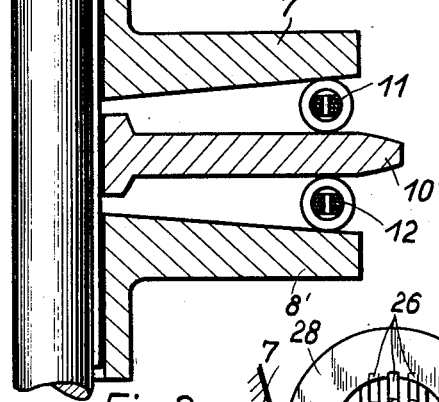
Fig. 3 shows a part of the outer peripheries of discs adapted to be employed on one of the shafts of Fig. 1 on an enlarged scale and having a shape somewhat different from that of the discs of Fig. 1.

Ball members 13 are pressed against the outer side surfaces of discs 5 and 6 by the thrust bearing rings 14, while ball members 15 are pressed against the outer side surfaces of discs 7 and 8 by the thrust bearing rings 16. Each of these rings has located along a diameter thereof a pair of pins which are fixed to and extend from the rings, these pins extending into openings of the bars 19 and 20. As is apparent from Figs. 1 and 2, a pair of bars 19 are in turnable engagement with the pins extending from the rings 14 and 15 which press the ball members against the discs 5 and 7, while a pair of bars 20 are in turnable engagement with the pins extending from the corresponding rings associated with the discs 6 and 7. Intermediate the discs the bars 19 are turnably connected to the reduced ends 17 of a block extending between the bars 19 and formed with a threaded bore through which extends the threaded portion of an adjusting member shown in Fig. 1 between the shafts 1 and 2, and this adjusting member also extends threadedly through a threaded bore of a similar block which has reduced ends 18 extending through suitable bores in the bars 20. The distance between the bars 19 and 20 at the point where these bars are in engagement with reduced ends 17 and 18 is set usually once when the apparatus is new and all subsequent adjustments for varying the power transmission are made elsewhere, so that the reduced ends 17 and 18 may be considered as providing stationary pivots. The adjustments made to vary the transmission ratio take place through the blocks 22 and 23 shown at the right end parts of Figs. 1 and 2. The block 22 has a pair of reduced ends extending through bores in bars 19 while the block 23 has a pair of reduced ends extending through bores in the bars 20. A threaded rod 21 extends through threaded bores of the blocks 22 and 23, as shown in Fig. 1, and this rod 20 is provided with a hand wheel 24. Of course, the portion of rod 21 which is in threaded engagement with block 22 is threadedly oppositely from the portion of rod 21 which is in threaded engagement with the block 23. Thus, upon turning of the hand wheel 24 and rod 21 therewith, the blocks 22 and 23 will be moved toward or away from each other to simultaneously turn the bars 19 and 20 in opposite directions, respectively, about pivots 17 and 18, respectively, so that in this way one of the pairs of discs 5, 6 and 7, 8 will be moved toward each other while the other of these two pairs of discs simultaneously move away from each other, and thus the transmission ratio may be adjusted. It will be noted that the radii along which the transmission belts move are changed in this way, in order to produce the change in the transmission ratio. Furthermore, the pairs of outer discs move symmetrically with respect to each other so that the discs 9 and 10 remain stationary on the shafts 1 and 2, respectively. These discs, however, are capable of shifting automatically in order to automatically compensate for slight differences in the lengths of the belts 11 and 12 and at the same time evenly distribute the load therebetween. These discs 9 and 10 actually can have flat outer side faces, but it is preferred to make these side faces slightly conical, as indicated above, so that the belts can be easily placed between the discs, without rubbing against the rims of the discs. Fig. 3 shows a variation where the disc 10' is in fact flat at its outer side faces up to a radius equal to that of the discs 7' and 8', the disc 10' then tapering, as shown in Fig. 3, at the peripheral portion of disc 10' which is located beyond the discs 7' and 8'. Of course, this same arrangement would be provided with the discs on both shafts.

It is pointed out that the discs 5 and 6 need not have their inner side faces conical to the same degree as the inner side faces of the discs 7 and 8. The stable maintenance of the load distribution between the belts is enhanced by making the inner side faces of discs 7 and 8 conical to a degree different from the inner side faces of the discs 5 and 6, so that the pressures of the discs on the belts are different at the driving and driven shafts.

Figure 4:
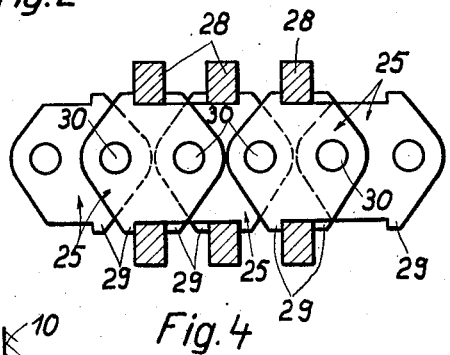
Fig. 4 shows partly in section a part of a flexible belt capable of being used in the structure of the present invention.
Figure 5:
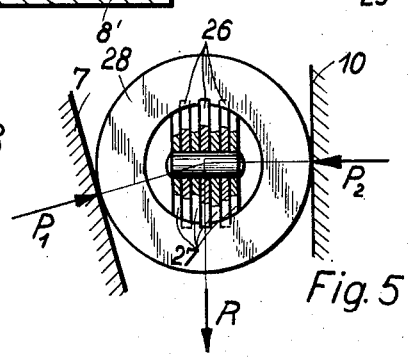
Fig. 5 is a partly sectional, fragmentary illustration of the engagement between the discs and a flexible belt of the type shown in Fig. 4 and the forces resulting from this engagement.

Because of the different inclinations of the side faces of the outer and inner discs, torsional stresses would normally arise in the belts. In order to eliminate such torsional stresses it is preferred to provide the belts with an outer surface means which directs the forces transmitted to the belts by the discs to a single point so as to prevent occurrences of torsional stresses. For example, the belts may be of a circular cross section in order to accomplish this result. As a specific example of a belt made of metal and capable of eliminating all torsional stresses, the belt of Figs. 4 and 5 is made up of a plurality of links 25. As is apparent from Fig. 5 each link 25 is made up of alternating plates 26 and 27 which are bored to receive a pivot pin 30. These plates are each provided adjacent one end with projections 29, and the plates are grouped together with the projections 29 distributed between opposite ends of the group, as is evident from Fig. 4. In the annular space located between each pair of projections 29 is located the inner periphery of a ring 28 which is thus turnable on the chain but is not axially movable therealong and these links 28 are distributed along the length of the chain, as is evident from Fig. 4.

As is shown in Fig. 5 when each ring 28 is in engagement with the conical face of one of the outer discs, such as disc 7, and the side face of one of the inner discs, such as disc 10, the forces $P_1$, $P_2$ transmitted to the ring by the discs intersect at a point located on the vector R which is directed radially toward the shaft axis and which represents the force produced by the tension in the belt. Because of this intersection of forces at a common point, no torsional stresses are produced in the belt. Of course, this same result is capable of being produced with any belt of circular cross section, such as a leather or rubber belt, so that non-metallic belts also may be used with the structure of the invention, metallic belts being preferred only because they are capable of transmitting greater loads.

It will be understood that each of the elements described above, or two or more together, may also find a useful application in other types of power transmissions differing from the types described above.

While the invention has been illustrated and described as embodied in infinitely variable power transmissions, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an infinitely variable power transmission, in combination, a driving shaft; a driven shaft spaced from and parallel to said driving shaft; a pair of outer discs mounted on each shaft for rotation therewith, each pair of outer discs respectively having conical inner side faces directed toward each other; a pair of elongated, endless metal link belts spaced from and extending about said shafts and respectively located in parallel planes normal to the same, said belts being respectively flexible in said planes but incapable of flexing transverse thereto, one of said metal link belts engaging said conical face of one of each pair of discs and the other of said metal link belts engaging said conical face of the other of each pair of discs; and a pair of inner discs respectively mounted on said shafts for turning movement therewith and for free axial movement therealong, said inner pair of discs being located between and in engagement with said pair of metal link belts to maintain the latter in engagement with said outer pairs of discs to transmit a drive from driving to said driven shaft, the free movability of said inner pair of discs axially along said shafts, respectively, serving to automatically distribute the load evenly between said pair of metal link belts, the outer side faces of each of said inner discs having belt engaging portions which are only slightly conical and substantially less conical than said inner faces of said outer discs so that said belts remain substantially in said planes irrespective of the distances between said outer discs and inner discs.

2. In an infinitely variable power transmission, in combination, a driving shaft; a driven shaft spaced from and parallel to said driving shaft; a pair of outer discs mounted on each shaft for rotation therewith, each pair of outer discs respectively having conical inner side faces directed toward each other; a pair of elongated, endless metal link belts spaced from and extending about said shafts and respectively located in parallel planes normal to the same, said belts being respectively flexible in said planes but incapable of flexing transverse thereto, one of said metal link belts engaging said conical face of one of each pair of discs and the other of said metal link belts engaging said conical face of the other of each pair of discs; and a pair of inner discs respectively mounted on said shafts for turning movement therewith and for free axial movement therealong, said inner pair of discs being located between and in engagement with said pair of metal link belts to maintain the latter in engagement with said outer pairs of discs to transmit a drive from said driving to said driven shaft, the free movability of said inner pair of discs axially along said shafts, respectively, serving to automatically distribute the load evenly between said pair of metal link belts, the outer side faces of said inner discs having belt engaging portions which are conical to a degree small enough to appear substantially flat so that said belts remain substantially in said planes irrespective of the distances between said outer discs and inner discs.

3. In an infinitely variable power transmission, in combination, a driving shaft; a driven shaft spaced from and parallel to said driving shaft; a pair of outer discs mounted on each shaft for rotation therewith, each pair of outer discs respectively having conical inner side faces directed toward each other; a pair of elongated, endless metal link belts spaced from and extending about said shafts and respectively located in parallel planes normal to the same, said belts being respectively flexible in said planes but incapable of flexing transverse thereto, one of said flexible belts engaging said conical face of one of each pair of discs and the other of said metal link belts engaging said conical face of the other of each pair of discs; and a pair of inner discs respectively mounted on said shafts for turning movement therewith and for free axial movement therealong, said inner pair of discs being located between and in engagement with said pair of metal link belts to maintain the latter in engagement with said outer pairs of discs to transmit a drive from said driving to said driven shaft, the free movability of said inner pair of discs axially along said shafts, respectively, serving to automatically distribute the load evenly between said pair of metal link belts, the outer side faces of said inner discs having belt engaging portions which are only slightly conical and an element of each conical side face of said inner discs extending radially toward the center of said disc making an angle of approximately 1° with a plane normal to said shafts so that said belts remain substantially in said planes irrespective of the distances between said outer discs and inner discs.

4. In an infinitely variable power transmission, in combination, a driving shaft; a driven shaft spaced from and parallel to said driving shaft; a pair of outer discs mounted on each shaft for rotation therewith, each pair of outer discs respectively having conical inner side faces directed toward each other; a pair of elongated, endless flexible belts spaced from and extending about said shafts and respectively located in parallel planes normal to the same, said belts being respectively flexible in said planes but incapable of flexing transverse thereto, one of said flexible belts engaging said conical face of one of each pair of discs and the other of said flexible belts engaging said conical face of the other of each pair of discs, each of said belts being in the form of a chain made up of a plurality of metal links and having a plurality of annular members turnably carried by said links and having outer peripheries located beyond said links to engage said discs; and a pair of inner discs respectively mounted on said shafts for turning movement therewith and for free axial movement therealong, said inner pair of discs being located between and in engagement with said pair of flexible belts at said annular members thereof to maintain said belts in engagement with said outer pairs of discs to transmit a drive from said driving to said driven shaft, the free movability of said inner pair of discs axially along said shafts, respectively, serving to automatically distribute the load evenly between said pair of flexible belts, the outer side faces of each of said inner discs being substantially flat and substantially parallel to each other at the parts thereof engaging said belts so that said belts remain substantially in said planes irrespective of the distances between said outer discs and inner discs.

5. In an infinitely variable power transmission, in combination, a driving shaft; a driven shaft spaced from and parallel to said driving shaft; a pair of outer discs mounted on each shaft for rotation therewith, each pair of outer discs respectively having conical inner side faces directed toward each other; a pair of elongated, endless flexible metal link belts spaced from and extending about said shafts and respectively located in parallel planes normal to the same, said belts being respectively flexible in said planes but incapable of flexing transverse thereto, one of said flexible belts engaging said conical face of one of each pair of discs and the other of said flexible belts engaging said conical face of the other of each pair of discs; and a pair of inner discs respectively mounted on said shafts for turning movement therewith and for free axial movement therealong, said inner pair of discs being located between and in engagement with said pair of flexible belts to maintain the latter in engagement with said outer pairs of discs to transmit a drive from said driving to said driven shaft, the free movability of said inner pair of discs axially along said shafts, respectively, serving to automatically distribute the load evenly between said pair of flexible belts, said inner discs having an outer diameter greater than that of said outer discs and having substantially parallel, flat, belt-engaging side face portions located within a radius equal to the radius of said outer discs so that said belts remain substantially in said planes irrespective of the distances between said outer discs and inner discs, and said inner discs being tapered at their peripheral portions which are located beyond said outer discs.

6. In an infinitely variable power transmission, in combination, a driving shaft; a driven shaft spaced from and parallel to said driving shaft; a pair of outer discs mounted on each shaft for rotation therewith, each pair of outer discs respectively having conical inner side faces directed toward each other; a pair of elongated endless metal link belts spaced from and extending about said shafts and respectively located in parallel planes normal to the same, said belts being respectively flexible in said planes but incapable of flexing transverse thereto, one of said belts engaging said conical face of one of each pair of discs and the other of said belts engaging said conical face of the other of each pair of discs; and a pair of inner discs respectively mounted on said shafts for turning movement therewith and for free axial movement therealong, said inner pair of discs being located between and in engagement with said pair of belts to maintain the latter in engagement with said outer pair of discs to transmit a drive from said driving to said driven shafts, the outer side faces of each of said inner discs being substantially flat and substantially parallel to each other at the part thereof engaging said belts so that said belts remain substantially in said planes irrespective of the distance between said outer discs and said inner discs, said flat shape of said outer side faces of said inner discs together with the free movability of said inner pair of discs axially along said shafts, respectively, serving to automatically distribute the loads evenly between said pair of metal disc belts, each of said metal link belts having an outer surface means for directing forces transmitted to said belts by each outer disc and the inner disc located opposite the same to a single point so as to avoid torsional moments about the longitudinal axes of said belts.

References Cited in the file of this patent

UNITED STATES PATENTS

| | | |
|---|---|---|
| 782,479 | Becker | Feb. 14, 1905 |
| 815,345 | Gulowsen | Mar. 20, 1906 |
| 1,819,227 | Chorlton | Aug. 18, 1931 |
| 2,651,211 | Karig | Sept. 8, 1953 |

FOREIGN PATENTS

| | | |
|---|---|---|
| 368,050 | Great Britain | Mar. 3, 1932 |
| 373,611 | France | May 22, 1907 |
| 692,864 | France | Nov. 12, 1930 |